United States Patent
Babicki et al.

(10) Patent No.: US 11,953,104 B2
(45) Date of Patent: Apr. 9, 2024

(54) ROTARY MULTI-WAY DISTRIBUTOR WITH PLURAL PORT TRACKS

(71) Applicants: Matthew L. Babicki, West Vancouver (CA); Edson Ng, North Vancouver (CA)

(72) Inventors: Matthew L. Babicki, West Vancouver (CA); Edson Ng, North Vancouver (CA)

(73) Assignee: Pathway Industries, Inc., Burnaby (CA)

( * ) Notice: Subject to any disclaimer, the term of this patent is extended or adjusted under 35 U.S.C. 154(b) by 0 days.

(21) Appl. No.: 17/585,727

(22) Filed: Jan. 27, 2022

(65) Prior Publication Data

US 2022/0243829 A1     Aug. 4, 2022

Related U.S. Application Data

(60) Provisional application No. 63/143,387, filed on Jan. 29, 2021.

(51) Int. Cl.
    *F16K 11/074*     (2006.01)

(52) U.S. Cl.
    CPC ........ *F16K 11/074* (2013.01); *F16K 11/0743* (2013.01)

(58) Field of Classification Search
    CPC .......................... F16K 11/074; F16K 11/0743
    See application file for complete search history.

(56) References Cited

U.S. PATENT DOCUMENTS

| | | | |
|---|---|---|---|
| 2,979,963 A | | 4/1961 | Snoy |
| 3,494,175 A | * | 2/1970 | Cusick ..................... G01M 9/00 |
| | | | 73/756 |
| 3,747,630 A | * | 7/1973 | Hurrell ................... G01N 30/24 |
| | | | 137/625.46 |
| 3,868,970 A | * | 3/1975 | Ayers ..................... F16K 11/074 |
| | | | 137/625.46 |
| 3,964,513 A | * | 6/1976 | Molner ................. F16K 11/074 |
| | | | 73/864.83 |
| 4,134,425 A | * | 1/1979 | Gussefeld .............. B01J 8/0278 |
| | | | 137/625.3 |
| 4,452,612 A | | 6/1984 | Mattia |
| 4,469,494 A | | 9/1984 | van Weenen |
| 4,633,904 A | * | 1/1987 | Schumann ............ F16K 11/074 |
| | | | 137/625.46 |
| 4,722,830 A | * | 2/1988 | Urie ........................ G01N 35/08 |
| | | | 422/62 |
| 4,790,858 A | | 12/1988 | Sircar |

(Continued)

*Primary Examiner* — Matthew W Jellett
*Assistant Examiner* — Christopher D Ballman
(74) *Attorney, Agent, or Firm* — Klarquist Sparkman, LLP

(57) ABSTRACT

Disclosed herein are embodiments of a valve assembly for providing selective flow communication between a plurality of fluid flow conduits. The valve assembly may comprise two valve members disposed coaxially in fluidly sealing contact and relatively rotatable to provide valving action of at least two port tracks. At least one valve member may comprise a fluid pressure loading means, and the fluid pressure loading means may span at least two port tracks. The valve assembly may further comprise a drive means for driving relative rotation of the valve members in order to enable cycled interconnection and fluid flow through the fluid flow conduits.

10 Claims, 4 Drawing Sheets

(56) References Cited

U.S. PATENT DOCUMENTS

| | | | |
|---|---|---|---|
| 4,957,008 A * | 9/1990 | Proni | G01N 35/1097 436/179 |
| 5,112,367 A | 5/1992 | Hill | |
| 5,248,325 A | 9/1993 | Kagimoto et al. | |
| 5,441,559 A | 8/1995 | Petit et al. | |
| 5,620,025 A * | 4/1997 | Lewin | F16K 11/074 137/625.15 |
| 5,650,577 A * | 7/1997 | Nagai | G01N 35/1097 436/179 |
| 6,051,050 A | 4/2000 | Keefer et al. | |
| 6,431,202 B1 * | 8/2002 | Ahlgren | F16K 11/0743 137/625.15 |
| 6,537,451 B1 * | 3/2003 | Hotier | B01D 15/1842 210/659 |
| 6,818,068 B1 * | 11/2004 | Guiffant | B29C 51/22 156/345.31 |
| 6,997,213 B1 * | 2/2006 | Towler | F16K 11/074 210/264 |
| RE40,006 E | 1/2008 | Keefer et al. | |
| 8,272,401 B2 | 9/2012 | McLean | |
| 8,434,512 B2 * | 5/2013 | Bergmann | F16K 11/074 137/625 |
| 8,656,955 B2 * | 2/2014 | Price | F16K 11/074 137/625.46 |
| 8,960,231 B2 * | 2/2015 | Picha | G01N 30/20 137/625.46 |
| 9,010,370 B2 * | 4/2015 | Isenhour | F16K 31/043 251/368 |
| 9,120,049 B2 * | 9/2015 | Sundaram | F16K 31/041 |
| 9,618,158 B2 * | 4/2017 | Killeen | F17D 3/00 |
| 9,739,383 B2 * | 8/2017 | Nichols | G01N 30/20 |
| 10,302,603 B2 * | 5/2019 | Olovsson | F16K 11/076 |
| 10,309,938 B2 * | 6/2019 | Olovsson | F16K 11/0743 |
| 11,389,843 B2 * | 7/2022 | Saier | A47L 15/449 |
| 2004/0182456 A1 * | 9/2004 | Rousselin | F16K 11/074 137/625.3 |

\* cited by examiner

ROTARY MULTI-WAY DISTRIBUTOR WITH PLURAL PORT TRACKS

CROSS REFERENCE TO RELATED APPLICATION

This application claims the benefit of the earlier filing date of U.S. provisional patent application No. 63/143,387, filed Jan. 29, 2021, which is incorporated herein by reference in its entirety.

BACKGROUND

The present disclosure relates to fluid handling devices used to simultaneously direct multiple fluid flows in processes where process flow streams are switched between fluid processing units. Conventional industrial process examples are simulated moving bed and pressure swing adsorption (PSA) processes.

The disclosure further relates to rotary distributors used as these fluid handling devices. A method of reducing the complexity, costs, and potential leakage of required controls and valving is to use multiport rotary distributors. Fluid processing units are intended to alter fluid properties directed into and out of it. Typical fluid processing units comprise flow conditioning apparatus such as pressure regulators, pumps, heat exchangers, throttling equipment and filters, or chemically altering apparatus such as catalytic or non-catalytic reactors, membranes and adsorbent beds. A multiport rotary distributor can be used for fluid handling devices that require alternate fluid flow paths during states of service.

A multiport rotary distributor consists of at least 2 components, with a common sealing surface across a surface of coaxial rotation, and rotating with respect to each other. Further, the at least 2 components allow for a plurality of different flow passages to close or open functionally as valves, based on the relative rotational position of the two components.

Although rotary valve sealing surfaces can be made from any surface of rotation around a coaxial axis, the most practical comprise of either a flat surface or a conical or cylindrical surface. Rotary distributor seal components comprise of process fluid conduits from fluid processing units ending on the sealing surface as openings named herein as ports. The ports are placed on a pitch circle on the surface of rotation. The pitch circle is designed to provide adequate spacing between ports to generate suitable valving of angularly spaced open and closed conditions. The swept area of the ports defined by the pitch circle on the sealing surface is herein called a port track. Rotary distribution of a plurality of fluid flow conduits with one port track on a sealing surface has been disclosed in Mattia U.S. Pat. No. 4,452,612, van Weenen U.S. Pat. No. 4,469,494 and Hill U.S. Pat. No. 5,112,367, all of which are incorporated herein by reference in their entireties. Alternate versions of multiport distributors use a third rotating component between the first two components to create the same switching action. Examples of disclosed cylindrical or conical sealing surfaces include Keefer U.S. Pat. No. 6,051,050, which is incorporated herein by reference in its entirety.

Multiport valve assemblies are designed to minimize leakage of the fluid in the flow passages at the common sealing surface by compressing the sealing surface with static means such as interference fit or spring urging methods. In situations where ports are flowing fluids at different pressures, the use of pressure loading technology, where the interconnected fluid pressure is used to urge the seal surfaces together, is an important technology for low torque, low heat generation, and long life. Pressure loading technology is most easily applied to face seal geometries, where the accommodation of sealing forces can be performed without a change in seal geometry. Pressure balance technology in fluid seals includes Snoy 2,979,963, which is incorporated herein by reference in its entirety. Keefer U.S. RE40006, incorporated herein by reference in its entirety, describes pressure swing adsorption applications of rotary distributors that switch flows at each end of a set of adsorbent beds, and is included herein. Solutions to geometric problems of the pressure loading technology in larger port sizes has been disclosed by McLean U.S. Pat. No. 8,272,401, which is incorporated herein by reference in its entirety.

Keefer utilized two seal surfaces, each one controlling flow distribution to one end of the set of adsorbers. Combining these port tracks onto a single seal surface is an important consideration in creating a lower cost multiport rotary distributor for the industry. Previous multiple port track sealing surface disclosures comprise Kagimoto U.S. Pat. No. 5,248,325 and Petit U.S. Pat. No. 5,441,559, both of which are incorporated herein by reference in their entireties.

Despite these improvements, further advancement in multiport valves using pressure loading technology is needed.

SUMMARY

Disclosed herein are embodiments of a valve assembly for providing selective flow communication between a plurality of fluid flow conduits (FIG. 3 reference number 9, 10 and 11). The valve assembly may comprise two valve members (FIG. 3 reference numbers 2 and 3) disposed coaxially in fluidly sealing contact and relatively rotatable to provide valving action of at least two port tracks. At least one valve member may comprise a fluid pressure loading means, and the fluid pressure loading means may span at least two port tracks. The valve assembly may further comprise a drive means (reference number 20) for driving relative rotation of the valve members in order to enable cycled interconnection and fluid flow through the fluid flow conduits. In some embodiments, the fluid flow conduits of one valve member are connected to a fluid handling unit (FIG. 4 reference numbers 2-7). And/or the fluid handling units may rotate with respect to ground, or they may be stationary with respect to ground.

The foregoing and other objects, features, and advantages of the technology will become more apparent from the following detailed description, which proceeds with reference to the accompanying figures.

DETAILED DESCRIPTION

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting.

Multiport rotary distribution valves require at least two valve members. Each valve member contains at least two fluid flow conduits that each terminate on the sealing surface as an opening on the surface known as a port. The two valve members are mated via at least one sealing surface, which is in the shape of a surface of revolution. The valve members are relatively rotated around a co-located axis, which the sealing surface is also coaxially located. Valve members can be made of metals, ceramics, plastics or other substances that provide adequate rigidity and imperviousness to the fluids to be conveyed. A valve member may consist of an assembly of components or a single part. In general, a valve member rotates relatively to the other valve member as a single assembly (FIG. 3, reference number 1, FIG. 4, reference numbers 37 and 77). Although not essential, in general one valve member is fixed with respect to the ground and the other member rotates against the grounded member. A multiport distribution valve may have more than one sealing surface that is relatively rotated around the co-located axis.

Figure 3:
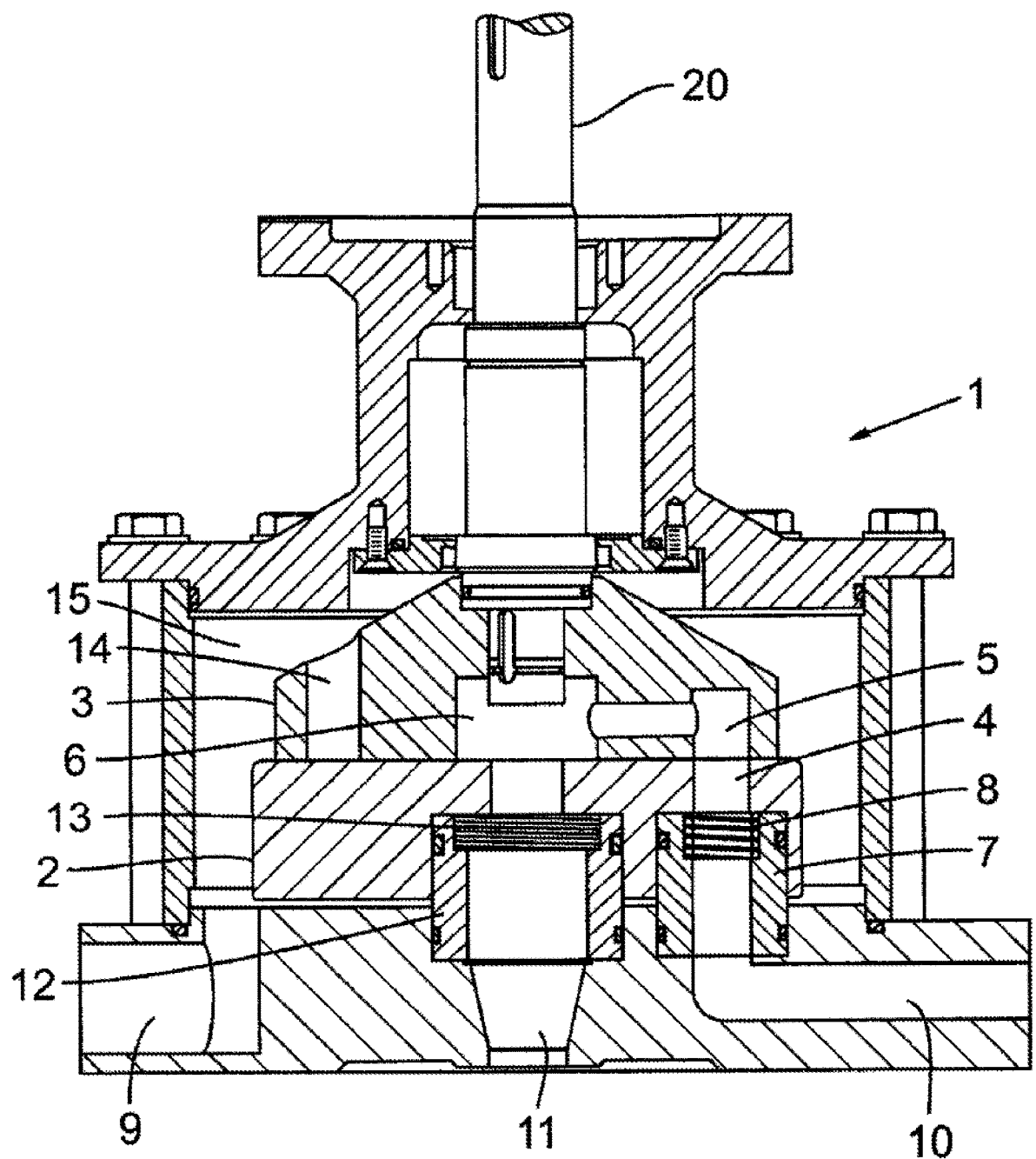
FIG. 3 is a schematic diagram of a cross section of a feed end of a prior art PSA device in commercial use which comprises a rotary valve.
Figure 4:
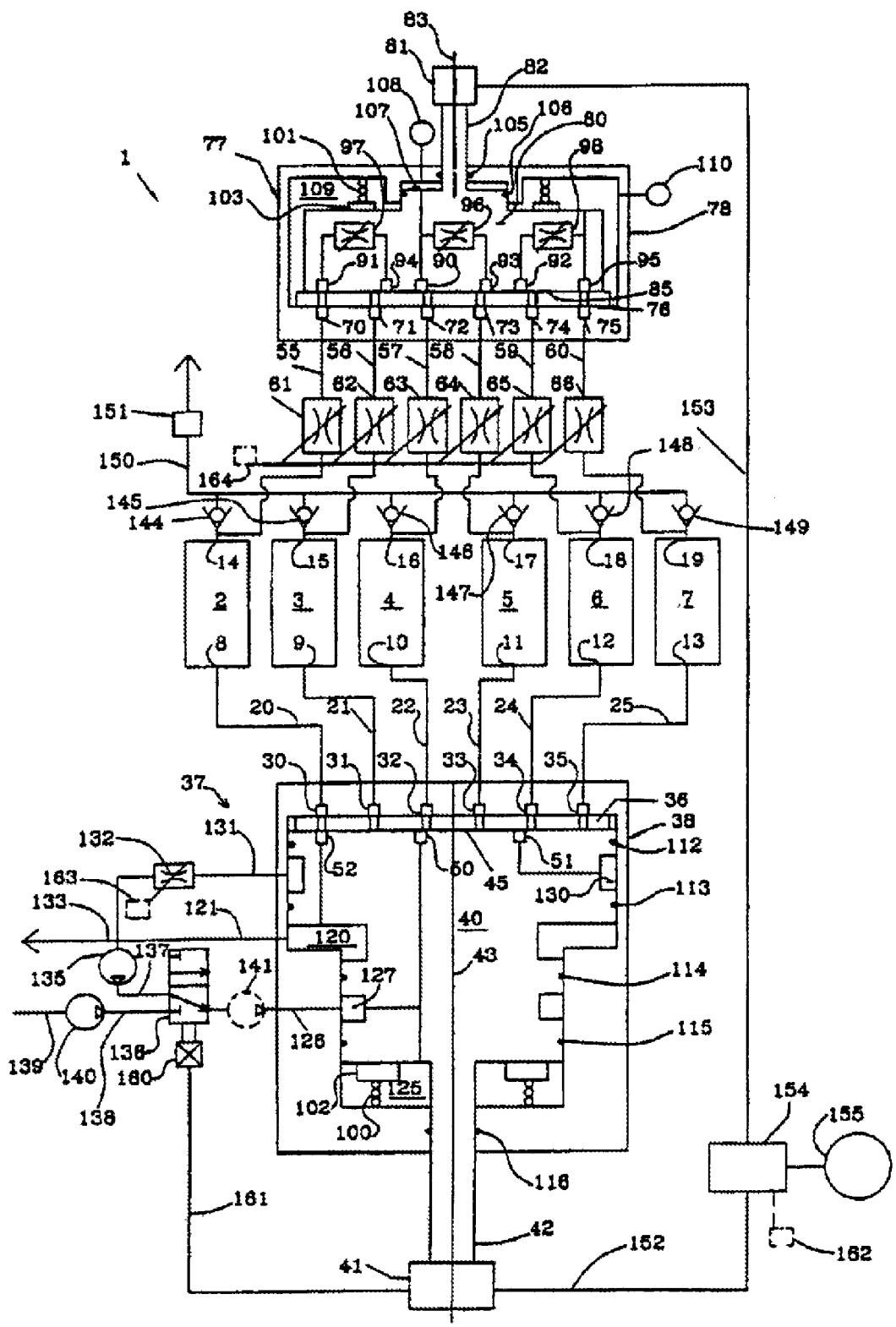
FIG. 4 shows a simplified schematic of a prior art six bed pressure swing adsorption apparatus with one pressure equalization step.

The seal between the two valve members may require force to urge the members together so that the fluid does not leak on the sealing surface intersection between the two valve members. In settings where the valve member ports are at a relative pressure difference to each other or to the sealing surface pressure, engagement forces higher than the sum of the port fluid forces onto the sealing surface are required to ensure sealing. Methods of applying engagement force comprise springs, clamps, externally actuated pistons, tension and/or compression members and apparatus, gravity based forces, magnetic based forces, and the like. Sealing forces create friction-based torque when relatively rotating the valve members. In circumstances where the valve member ports are at different pressures to each other, an intermittently actuated pressure piston may be applied to reduce the torque. This method is disclosed in McLean 8,272,401 as variable loading means, herein called pressure balance means (FIG. 3 reference number 7).

Figure 1:
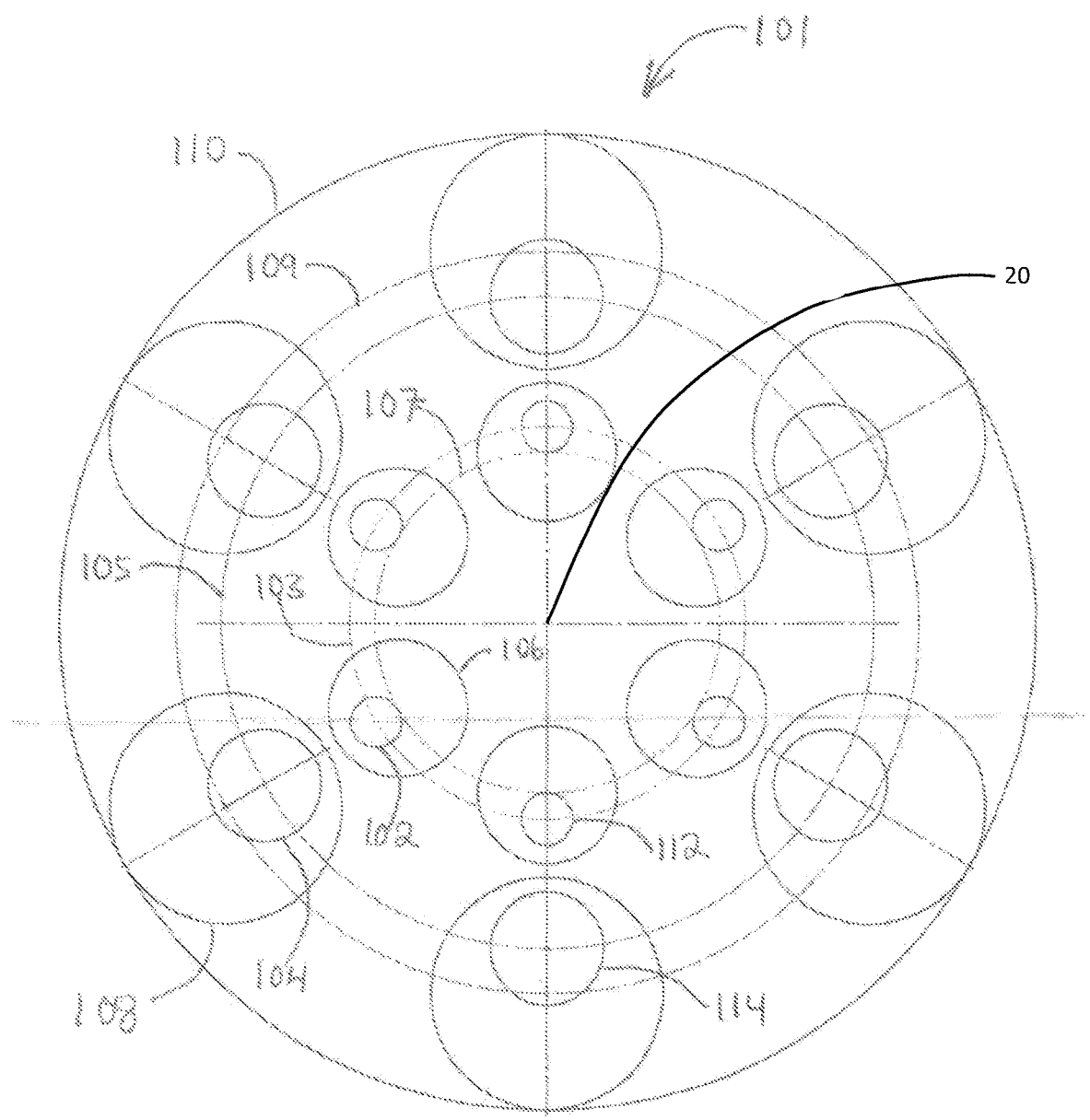
FIG. 1 is a schematic diagram illustrating the face seal geometry known in the prior art.

An example is used to highlight the difference between prior art and this patent. A process requires a set of 13 mm diameter ports, as well as a set of 24 mm ports, 6 ports each, on two port tracks. FIG. 1 depicts the geometry of a prior art face seal 101 that uses two port tracks. The face seal geometry consists of 6 equally spaced 13 mm diameter ports 102 located on an inner port pitch circle 103 set at 101 mm diameter. These ports define a port track (not shown) shaped as an annulus of 94.5 mm diameter to 107.5 mm diameter. A second set of 6 equally spaced 29 mm diameter ports 104 is located on an outer port pitch circle 105 set at 167 mm diameter. An outer port track (not shown) is shaped as an annulus of 152.5 mm to 181.5 mm. Pressure balance pistons are utilized to urge the valve member onto the seal surface. The location of the pressure balance pistons is centred over the ports but shifted radially to eliminate overlap, where the 13 mm port has an associated piston diameter 106 of 36 mm on a pitch circle 107 of 88 mm, and the 29 mm diameter port has an associated piston diameter 108 of 60 mm on a pitch circle 109 at 190 mm. The valve member minimum diameter 110 is 250 mm.

Multiport distribution valve assemblies may have ports located radially on a radial arm that are associated with the same fluid processing unit. FIG. 1 face seal 101 can depict a seal surface fluidly connected system with six fluid processing units, where each set of ports on a radial arm are fluidly connected to the same fluid processing unit. In FIG. 1, port 102 can be connected to the same processing unit as port 104, and port 112 is likewise associated with port 114. Associated ports may also be offset rather than in direct radial geometry.

Figure 2:
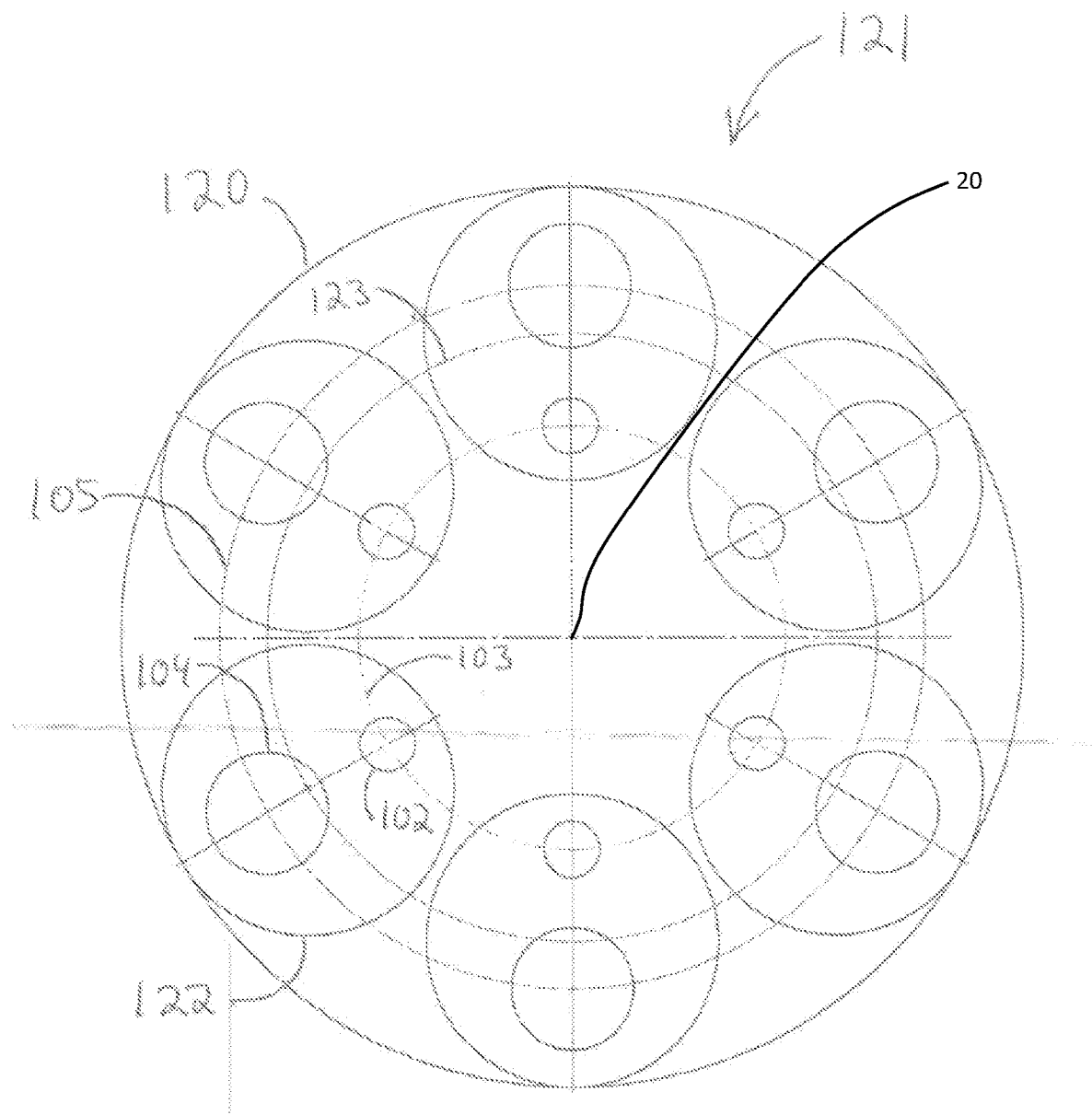
FIG. 2 is a schematic diagram illustrating an embodiments of the present technology comprising a single piston encircling both associated ports.

FIG. 2 depicts the technology disclosed herein. The pressure balance means is reduced to a single piston encircling both associated ports. Face seal 121 comprises the same port geometry of seal 101, which have the same port tracks. A single pressure balance piston 122 of diameter 69 mm on a pitch circle 123 of 145 mm provides the same seal closing forces as the combination of piston area 106 and 108. The OD 120 of the revised face seal 121 is 214 mm, which is 14% smaller than OD 110. For the same pressure balance, the torque of seal 121 is reduced by 37% compared to the torque of seal 101. Face seal 121 geometry provides for less size, less number of parts, less torque and less complexity compared to face seal 101.

The rotary distributor can use different sized ports, such as having a larger port inside and smaller port outside. The distributor can also use non-circular shapes for either or both port sets and for pressure balance areas to even better reduce the size of the sealing surface to the minimum required, which reduces torque as well as manufacturing precision requirements. Shapes can include other convex or concave port sides, or square to the radius. Ports may be segmental shapes for best fit to a circular geometry. The ports can be designed to create slow or fast opening action based on the geometries of the combined ports in partially open states. Rotary distributors can have port tracks as individual sealing surfaces or can be on a single continuous surface on one sealing element or both, including sealing surfaces broken up with a discontinuation of the surface such as a groove.

On a cylindrical or conical sealing surface, where the port tracks are at different axial positions, a shared pressure balance device will reduce the axial length of the seal surface in the same manner as the face seal configuration.

Placing both ports onto one distributor seal is additionally beneficial when coupled with fluid processing unit designs where both inlet and outlet nozzles are in close proximity rather than at opposite ends. Numerous designs with this feature are available including U shaped or concentric internal pathways or radial flow units that are constructed to have both flow nozzles close together.

The rotary distributor can be actuated with constant rotational speed, or it can be actuated with a cycling high and low rotational speed at a frequency of N times per rotation, where N is the number of ports on a port track. The distributor can also be actuated by electrical or mechanical or other means to be indexed from position to position, with little or no motion between index movements.

Although the example above depicts two port tracks, the use a third or more set of ports on a pitch circle is also contemplated. These can be used in systems that withdraw or inject gases such as described in Sircar 4790858 for additional process beds. Associated processes that can operate at the same switching frequency can also be used on the same seal surface. One example is a trim purification set of adsorbent beds and fluidly connected port tracks in conjunction with a bulk separation set of adsorbent beds on separate port tracks, where the pressure balance means are at least partially shared.

In view of the many possible embodiments to which the principles of the disclosed technology may be applied, it should be recognized that the illustrated embodiments are only preferred examples of the technology and should not be taken as limiting the scope of the disclosure. Rather, the scope of the technology is defined by the following claims. We therefore claim as our technology all that comes within the scope and spirit of these claims.

We claim:

1. A valve assembly for providing selective flow communication between a plurality of fluid flow conduits comprising:
    two valve members disposed coaxially in fluidly sealing contact and relatively rotatable to provide valving action of at least two port tracks, where at least one valve member comprises pressure-balance means, and the pressure balance means spans at least two port tracks, and
    drive means for driving relative rotation of the valve members in order to enable cycled interconnection and fluid flow through the plurality of fluid flow conduits.

2. The valve assembly of claim 1, wherein one or more fluid flow conduits are associated with one valve member and the one or more fluid flow conduits are connected to a fluid handling unit.

3. The valve assembly of claim 2, wherein the fluid handling unit rotates with respect to ground.

4. The valve assembly of claim 2, wherein the fluid handling unit is stationary with respect to ground.

5. A valve assembly for providing selective flow communication between a plurality of fluid flow conduits comprising:
    two valve members disposed coaxially in fluidly sealing contact and relatively rotatable to provide valving action of at least two port tracks, where at least one valve member comprises a pressure balance piston, and the pressure balance piston spans at least two port tracks, and
    a drive shaft for driving relative rotation of the valve members in order to enable cycled interconnection and fluid flow through the plurality of fluid flow conduits.

6. The valve assembly of claim 5, wherein one or more fluid flow conduits are associated with one valve member and the one or more fluid flow conduits are connected to a fluid handling unit.

7. The valve assembly of claim 6, wherein the fluid handling unit rotates with respect to ground.

8. The valve assembly of claim 6, wherein the fluid handling unit is stationary with respect to ground.

9. A valve assembly for providing selective flow communication between a plurality of fluid flow conduits comprising:
    two valve members disposed coaxially in fluidly sealing contact and relatively rotatable to provide valving action of at least two port tracks, wherein
        each of the at least two port tracks is located on a pitch circle and at least two of the pitch circles has a different diameter, and
        at least one valve member comprises pressure-balance means, and the pressure balance means spans at least two port tracks; and
    drive means for driving relative rotation of the valve members in order to enable cycled interconnection and fluid flow through the plurality of fluid flow conduits.

10. The valve assembly of claim 9, wherein the two valve members provide valving action of a first port track and a second port track, wherein the first port track is located on a first pitch circle having a first diameter, and the second port track is located on a second pitch circle having a second diameter that is different from the first diameter.

* * * * *